US011562762B2

(12) United States Patent
Cox

(10) Patent No.: US 11,562,762 B2
(45) Date of Patent: Jan. 24, 2023

(54) SYSTEMS AND METHODS OF ASSESSING DRIVER SAFETY BASED ON VEHICLE NOISE LEVELS

(71) Applicant: BLUEOWL, LLC, San Francisco, CA (US)

(72) Inventor: Richard Paul Cox, Union City, CA (US)

(73) Assignee: BlueOwl, LLC, San Francisco, CA (US)

( * ) Notice: Subject to any disclaimer, the term of this patent is extended or adjusted under 35 U.S.C. 154(b) by 400 days.

(21) Appl. No.: 16/680,822

(22) Filed: Nov. 12, 2019

(65) Prior Publication Data

US 2022/0383886 A1    Dec. 1, 2022

(51) Int. Cl.
| *B60W 40/08* | (2012.01) |
| *G10L 21/0208* | (2013.01) |
| *G07C 5/00* | (2006.01) |
| *B60W 40/09* | (2012.01) |
| *B60W 50/14* | (2020.01) |

(52) U.S. Cl.
CPC ......... *G10L 21/0208* (2013.01); *B60W 40/09* (2013.01); *B60W 50/14* (2013.01); *G07C 5/008* (2013.01); *B60W 2040/0818* (2013.01)

(58) Field of Classification Search
CPC ... G10L 21/0208; B60W 40/09; B60W 50/14; B60W 2040/0818; G07C 5/008
See application file for complete search history.

(56) References Cited

U.S. PATENT DOCUMENTS

| 9,324,314 | B2 | 4/2016 | Park et al. |
| 9,428,052 | B1 | 8/2016 | Raz |
| 9,454,786 | B1 | 9/2016 | Srey et al. |
| 9,736,655 | B2 | 8/2017 | Schrader et al. |
| 9,758,095 | B2 | 9/2017 | Briggs et al. |
| 2012/0053805 | A1 | 3/2012 | Dantu |

(Continued)

FOREIGN PATENT DOCUMENTS

DE    102009045282    4/2011

OTHER PUBLICATIONS

Polyanskiy, V. (Jul. 2019). Car decibel sound level meter. Retrieved from https://apps.apple.com/us/app/car-decibel-sound-level-meter/id1462160392.

*Primary Examiner* — Hongmin Fan
(74) *Attorney, Agent, or Firm* — Faegre Drinker Biddle & Reath LLP

(57) ABSTRACT

Systems, methods, and techniques for assessing driver safety based on noise levels or sounds associated with the interior of a vehicle are provided. Noise levels or sounds associated with the interior of a vehicle over a first interval of time may be compared to indications of vehicle motion over the first interval of time to identify noise levels or sounds at times when the indications of vehicle motion indicate unsafe driving. The identified noise levels or sounds may be analyzed to determine noise levels, sources, and/or characteristics of sounds associated with unsafe driving. Noise levels or sounds associated with the interior of the vehicle over a second interval of time may be analyzed to determine instances in which the noise levels, sources, and/or characteristics of sounds associated with unsafe driving occur over the second interval of time. Alerts may be generated for vehicle operators based on the determined instances.

21 Claims, 5 Drawing Sheets

(56) References Cited

U.S. PATENT DOCUMENTS

2016/0027276 A1* 1/2016 Freeck ................. G08B 21/02
  340/576
2018/0281806 A1* 10/2018 Prakah-Asante ..... B60W 40/08

* cited by examiner

SYSTEMS AND METHODS OF ASSESSING DRIVER SAFETY BASED ON VEHICLE NOISE LEVELS

FIELD OF THE DISCLOSURE

The present disclosure generally relates to vehicle safety and, more particularly, to assessing driver safety based on noise levels or sounds associated with the interior of a vehicle.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Generally speaking, drivers who are distracted are more likely to drive in unsafe ways and even get into vehicle accidents. Loud noises or certain types of noises or sounds may be distracting to some drivers. However, noise levels or certain types of noises that are distracting to one driver may not necessarily be distracting to another driver, and vice versa.

SUMMARY

In one aspect, a computer-implemented method of assessing driver safety based on noise levels or sounds associated with the interior of a vehicle is provided. The method comprises: capturing, by one or more microphones associated with a vehicle, indications of noise levels associated with an interior of the vehicle over a first interval of time; capturing, by one or more motion sensors associated with the vehicle, indications of vehicle motion over the first interval of time; analyzing, by a processor, the indications of the vehicle motion over the first interval of time to determine one or more instances of unsafe driving behavior over the first interval of time; identifying, by the processor, noise levels at times associated with the one or more instances of unsafe driving behavior over the first interval of time; determining, by the processor, based on the noise levels at the times associated with the one or more instances of unsafe driving behavior, a threshold noise level above which instances of unsafe driving behavior occur with a frequency that is greater than a threshold frequency; capturing, by the one or more microphones associated with the vehicle, indications of noise levels associated with the interior of the vehicle over a second interval of time; identifying, by the processor, based on the indications of noise levels associated with the interior of the vehicle over a second interval of time, at least one instance in which the noise level associated with the interior of the vehicle exceeds the threshold noise level; and displaying, by a user interface, an alert indicating the identified at least one instance in which the noise level associated with the interior of the vehicle exceeds the threshold noise level.

In another aspect, a computer system for assessing driver safety based on noise levels or sounds associated with the interior of a vehicle is provided. The computer system comprises: one or more microphones associated with the vehicle, the one or more microphones configured to capture indications of sounds associated with the interior of the vehicle over a first interval of time and a second interval of time; one or more motion sensors associated with the vehicle, the one or more motion sensors configured to capture indications of vehicle motion over the first interval of time and a second interval of time; a user interface; one or more processors; and a non-transitory program memory configured to interface with the one or more microphones associated with the vehicle, the one or more motion sensors associated with the vehicle, the user interface, and the one or more processors. The non-transitory program memory stores executable instructions that, when executed by the one or more processors, cause the computer system to: analyze the indications of the vehicle movements over the interval of time to determine one or more instances of unsafe driving behavior over the first interval of time; identify the sounds captured at times associated with the one or more instances of unsafe driving behavior over the first interval of time; analyze the sounds captured by the one or more microphones at times associated with the one or more instances of unsafe driving behavior over the first interval of time to identify one or more sources associated with sounds captured at times associated with the one or more instances of unsafe driving behavior; identify, by the processor, based on the indications of sounds associated with the interior of the vehicle over the second interval of time, at least one instance in which a sound captured over the second interval of time is associated with one of the one or more identified sources; and display, via the user interface, an alert indicating the identified at least one instance in which a sound captured over the second interval of time is associated with one of the one or more identified sources.

In still another aspect, a tangible, non-transitory computer-readable medium storing executable instructions for assessing driver safety based on noise levels or sounds associated with the interior of a vehicle is provided. The executable instructions, when executed by at least one processor of a computer system, cause the computer system to: capture, by one or more microphones associated with a vehicle, indications of sounds associated with an interior of the vehicle over a first interval of time; capture, by one or more motion sensors associated with the vehicle, indications of vehicle motion over the first interval of time; analyze the indications of the vehicle movements over the interval of time to determine one or more instances of unsafe driving behavior over the first interval of time; identify the sounds captured at times associated with the one or more instances of unsafe driving behavior over the first interval of time; train a machine learning model, using the sounds captured at times associated with the one or more instances of unsafe driving behavior over the first interval of time as training data, to identify characteristics of sounds associated with instances of unsafe driving behavior; capture, by one or more microphones associated with a vehicle, indications of sounds associated with an interior of the vehicle over a second interval of time; apply the trained machine learning model to the sounds associated with the interior of the vehicle over the second interval of time to identify at least one instance in which a sound associated with the interior of the vehicle over the second interval of time has one of the identified characteristics; and display, by a user interface, an alert indicating the identified at least one instance in which a sound associated with the interior of the vehicle over the second interval of time has one of the identified characteristics.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
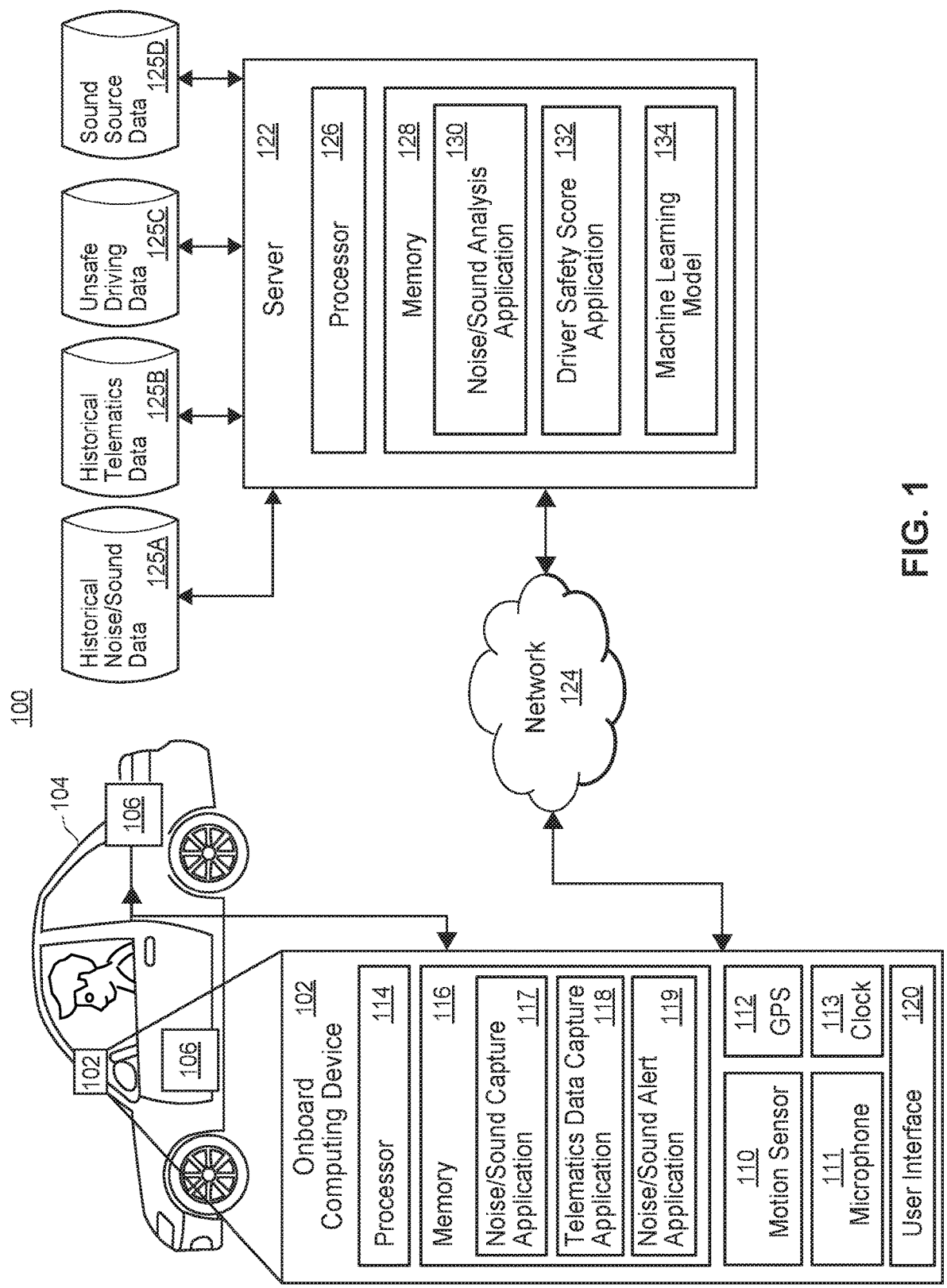
FIG. 1 illustrates a block diagram of an exemplary system for assessing driver safety based on noise levels or sounds associated with the interior of a vehicle, in accordance with some embodiments.

Generally speaking, drivers who are distracted are more likely to drive in unsafe ways and even get into vehicle accidents. Loud noises or certain types of noises or sounds may be distracting to some drivers. However, noise levels or certain types of noises that are distracting to one driver may not necessarily be distracting to another driver, and vice versa.

The present disclosure provides systems, methods, and techniques for assessing driver safety based on noise levels or sounds associated with the interior of a vehicle. The microphone of a mobile device positioned inside a vehicle (and/or other microphone or noise sensor positioned in the interior or exterior of a vehicle) may be used to capture sounds in the vehicle environment while a vehicle operator (e.g., driver) is operating the vehicle. For instance, the microphone or noise sensor may measure noise levels (e.g., in decibels) in the vehicle environment while the driver is operating the vehicle. Furthermore, the microphone or noise sensor may capture specific sounds in the vehicle environment while the driver is operating the vehicle. Additionally, motion sensors or other telematics sensors associated with the vehicle may capture motion data or other telematics data while the vehicle operator is operating the vehicle. The motion data or other telematics data may be analyzed to determine instances of unsafe driving behavior (e.g., speeding, hard braking, sharp cornering, etc.)

Historical noise levels or sounds (e.g., recorded over a first interval of time) may be analyzed in conjunction with historical motion data or other telematics data (e.g., recorded over the same first interval of time) to determine noise levels or sounds in the vehicle at times when instances of unsafe driving behavior occur. Accordingly, a determination may be made as to which noise levels or sounds in the vehicle are associated with instances of unsafe driving behavior. For instance, noise levels above a certain threshold level may be identified as being associated with higher rates of unsafe driving behavior (e.g., a number, frequency, or duration of instances of unsafe driving behavior above a certain threshold.) Similarly, certain sounds may be associated with higher rates of unsafe driving behavior. For instance, sounds from particular sources or sounds having particular characteristics may be identified as being associated with higher rates of unsafe driving behavior.

Accordingly, current noise levels or sounds (e.g., recorded over a second interval of time) may be analyzed to determine instances in which a noise level is above a threshold noise level, and/or instances in which sounds from identified sources and/or having particular identified characteristics are recorded. A sound or noise alert may be generated and displayed for the vehicle operator based on instances in which the noise level is above the threshold noise level and/or instances in which sounds from the identified sources and/or having the particular identified characteristics are recorded. In some examples, the sound or noise alert may be generated and displayed substantially simultaneously as the noise level above the threshold noise level, sound from the identified source, and/or sound having the particular identified characteristics is recorded. For instance, the alert may indicate that the current noise or sounds are associated with higher risk of unsafe driving behavior and may include a recommendation that a vehicle operator take a mitigating step (e.g., turning down loud music, rolling up windows when noise is originating from outside the vehicle, quieting down cell phone conversation, etc.). In other examples, the alert may be displayed at a later time (e.g., when the vehicle operator is no longer operating the vehicle) so that the vehicle operator is not further distracted by the alert.

Furthermore, a driver safety score for the second interval of time may be calculated based on instances in which a noise level is above a threshold noise level, and/or instances in which sounds from identified sources and/or having particular identified characteristics are recorded over the second interval of time. In particular, the driver safety score for the second interval of time may be calculated based on the number or frequency with which instances in which the noise level is above a threshold noise level, and/or instances in which sounds from identified sources and/or having particular identified characteristics are recorded over the second interval of time, occur. Additionally, in some examples, the driver safety score for the second interval of time may be calculated based on the extent to which the noise level in the vehicle exceeds the threshold noise level.

In some examples, the generation of the alert (and of the driver safety score) may be personalized for a particular vehicle operator or driver, or for particular groups of vehicle operators or drivers (e.g., drivers who drive in a particular region, drivers in a particular age group or other demographic group, etc.), based on historical recorded noises or sounds and historical instances of unsafe driving behaviors for the particular vehicle operator or driver or for a particular group of vehicle operators or drivers. Advantageously, the alert and/or driver safety score may be personalized based on which noise levels or sounds are distracting to particular vehicle operators or groups of vehicle operators.

Referring now to the drawings, FIG. 1 illustrates a block diagram of an exemplary system 100 for assessing driver safety based on noise or sounds associated with the interior of a vehicle, in accordance with some embodiments. The high-level architecture illustrated in FIG. 1 may include both hardware and software applications, as well as various data communications channels for communicating data between the various hardware and software components, as is described below. The system 100 may include an onboard computing device 102, which may be positioned within or otherwise associated with a vehicle 104 (which may be, e.g., a car, a truck, a boat, a motorcycle, a motorized scooter, or any other vehicle). For instance, an onboard computing device 102 may be built into the vehicle 104, or may be a mobile device (such as, e.g., a smart phone, a smart watch, a GPS system, etc.) associated with a driver or operator of the vehicle 104.

The onboard computing device 102 may communicate with various sensors to receive sensor data captured as a vehicle operator (e.g., driver) operates the vehicle 104. For instance, an onboard computing device 102 may receive sensor data captured by onboard sensors 106 associated with the vehicle, which may include, e.g., microphones, motion sensors such as accelerometers or gyroscopes, location sensors, etc. In some examples, in addition to or as an alternative to onboard sensors 106, the onboard computing devices 102 may include internal sensors. For instance, an onboard computing device 102 may include motion sensors 110, such as accelerometers and/or gyroscopes, microphones 111, location sensors 112 such as global positioning sensors configured to capture location data, etc. The onboard computing device 102 may further include a clock or timer 113. Furthermore, the onboard computing device 102 may include a user interface 120, which may be configured to receive input from users and/or to display information to users (e.g., drivers or operators).

Furthermore, each onboard computing device 102 may include one or more processors 114, such as one or more microprocessors, controllers, and/or any other suitable type of processors, and a memory 116 (e.g., volatile memory, non-volatile memory) accessible by the respective one or more processors 114, (e.g., via a memory controller). The one or more processors 114 may interact with the memory 116 to obtain, for example, computer-readable instructions stored on the memory 116. In particular, the computer-readable instructions stored on the memory 116 may include instructions for executing a noise/sound capture application 117 configured to cause microphones 111 to capture noise and/or sound data associated with the interior of the vehicle 104 over a particular period of time. Additionally or alternatively, the noise/sound capture application 117 may receive noise and/or sound data captured by onboard sensors 106 that include microphones or other noise sensors over a particular period of time. Furthermore, the noise/sound capture application 117 may transmit noise and/or sound data to a server 122 for further processing.

The computer-readable instructions stored on the memory 116 may further include instructions for executing a telematics data capture application 118 configured to cause a motion sensor 110, location sensor 112, clock 113, or other sensors of the onboard computing device 102 to capture telematics data (e.g., motion data, location data, time data, etc.) associated with the vehicle over a particular period of time. Additionally or alternatively, the telematics data capture application 118 may receive telematics data captured by onboard sensors 106. Furthermore, the telematics data capture application 118 may transmit telematics data to a server 122 for further processing.

Furthermore, the computer-readable instructions stored on the memory 116 may include instructions for executing a noise/sound alert application 119 configured to generate and/or display alerts (e.g., by the user interface 120) based on noise and/or sound data captured by microphones 111 and/or onboard sensors 106. For instance, the noise/sound alert application 119 may generate and/or display alerts when noise levels captured by the microphones 111 and/or onboard sensors 106 exceed a threshold noise level determined by a server 122 with which the onboard computing device 102 may be configured to communicate, and/or when sounds captured by the microphones 111 and/or onboard sensors 106 are determined to originate from particular sources and/or exhibit certain characteristics associated with unsafe driving (e.g., as determined by the server 122). Additionally, the noise/sound alert application 119 may generate and/or display alerts indicating a driver safety score associated with a driver of the vehicle 104 (e.g., as determined by the server 122). In some instances, the noise/sound alert application 119 may generate and/or display alerts substantially simultaneously as when a noise level above a threshold level is recorded, and/or a sound originating from a particular source and/or having particular characteristics is recorded. In other instances, the noise/sound alert application 119 may generate and/or display alerts at a time after the time at which the noise level above a threshold level is recorded, and/or the sound originating from a particular source and/or having particular characteristics is recorded. For instance, the noise/sound alert application 119 may generate and/or display alerts when the vehicle operator or driver is no longer operating the vehicle 104 (e.g., when a motion sensor 110 or onboard motion sensor 106 indicates that the vehicle 104 is likely stopped).

Moreover, the computer-readable instructions stored on the memory 116 may include instructions for carrying out one or more of the steps of the methods 300, 400, or 500, described in greater detail below with respect to FIGS. 3, 4, and 5 respectively.

The onboard computing device 102 may be configured to communicate with a server 122, e.g., via a network 124 (e.g., a wireless network). For instance, each onboard computing device 102 may communicate data captured by sensors such as the onboard sensors 106, motion sensors 110, microphones 111, location sensors 112, etc., to the server 122. In some examples, as discussed above, the onboard computing device 102 may communicate noise or sound data and times associated with the captured noise or sound data to the server 122, which may be configured to store the noise or sound data from the onboard computing device 102 associated with the vehicle 104 in a historical noise/sound database 125A. Additionally, in some examples, as discussed above, the onboard computing device 102 may communicate telematics data to the server 122, which may be configured to store the telematics data from the onboard computing device 102 associated with the vehicle 104, and times associated with the telematics data, in a historical telematics database 125B.

The server 122 may include one or more processors 126, such as one or more microprocessors, controllers, and/or any other suitable type of processors, and a memory 128 (e.g., volatile memory, non-volatile memory) accessible by the respective one or more processors 126, (e.g., via a memory controller). The one or more processors 126 may interact with the memory 128 to obtain, for example, computer-readable instructions stored in the memory 128. In particular, the computer-readable instructions stored on the memory 126 may include instructions for executing various applications, such as, e.g., a noise and/or sound analysis application 130 and/or a driver safety score application 132. In some examples, the memory 128 may further store a machine learning model 134.

As the processors 126 execute the applications, the server 122 may access various databases 125A-D, which may be internal or external to the server 122, such as the historical noise/sound database 125A configured to store noises or sounds captured by onboard sensors 106 and/or microphones 111 and times associated with each captured noise or sound, and/or the historical telematics database 125B configured to store telematics data captured by onboard sensors 106 and/or motion sensors 111, location sensors 112, etc., and times associated with the telematics data. Furthermore, in some examples, the server 122 may be configured to access indications of vehicle motion that are associated with various unsafe driving maneuvers stored in an unsafe driving database 125C. For instance, the unsafe driving database 125C may store indications of vehicle motion typically associated with speeding (e.g., measured velocity above a certain threshold value, measured acceleration above a certain threshold value), hard braking (e.g., measured deceleration above a certain threshold value), sharp cornering (e.g., measured angular velocity or angular acceleration above a certain threshold value), or other unsafe driving maneuvers. Moreover, in some examples, the server 122 may be configured to access indications of sounds associated with various sources stored in a sound source database 125D. For instance, the sound source database may store examples of sound (e.g., audio files) from various sources typically encountered in driving scenarios, such as, e.g., construction sounds, sounds associated with various types of music, engine sounds, honking sounds, etc. In some embodiments, the server 122 may access additional or alternative databases.

The noise and/or sound analysis application 130 may be configured to analyze noise levels and/or sounds captured by the microphones 111 and/or onboard sensors 106. In particular, the noise/and or sound analysis application 130 may compare noise levels and/or sounds captured by microphones 111 and/or onboard sensors 106 over a first interval of time to indications of vehicle motion captured by the motion sensor 110 and/or onboard sensors 106 over the first interval of time to determine noise levels and/or sounds occurring at times at which the motion of the vehicle indicates instances of unsafe driving. For instance, the noise and/or sound analysis application may identify the noise levels, sources, and/or characteristics of sounds captured during instances in which the motion of the vehicle indicates hard braking (e.g., rapid deceleration), sharp cornering (e.g., rapid angular velocity or rapid angular acceleration), speeding (e.g., high velocity or rapid acceleration), or other unsafe driving behaviors over a first interval of time. Based on the identified noise levels, sources, and/or characteristics of sounds captured during instances in which the motion of the vehicle indicates unsafe driving behaviors over the first interval of time, the noise and/or sound analysis application 130 may determine which noise levels and/or sounds are generally associated with unsafe driving behaviors.

For instance, the noise and/or sound analysis application 130 may determine a threshold noise level above which instances of unsafe driving behavior occur with a greater frequency. As another example, the noise and/or sound analysis application 130 may compare sounds associated with the unsafe driving behaviors over the first interval of time to examples of sounds from various sources in order to determine a likely source of each sound associated with unsafe driving behaviors over the first interval of time, i.e., to determine which sources of sound are most frequently associated with unsafe driving behaviors over the first interval of time. As still another example, the noise and/or sound analysis application 130 may train a machine learning model 134, using the sounds associated with unsafe driving behaviors over the first interval of time as training data, in order to identify one or more frequent characteristics of sounds associated with unsafe driving behaviors.

In some examples, the noise and/or sound analysis application 130 may transmit an indication of noise levels, sources, and/or characteristics of sounds associated with unsafe driving behaviors to the onboard computing device 102, so that the noise levels, sources, and/or characteristics of sounds associated with unsafe driving behaviors may be used by the noise/sound alert application 119 to determine instances in which sounds captured over a second interval of time have noise levels, sources, and/or characteristics associated with unsafe driving behaviors, and generate unsafe driving alerts for operators of the vehicle 104 accordingly.

The driver safety score application 132 may be configured to calculate a driver safety score for an operator of the vehicle 104 based on instances in which sounds captured over a second interval of time have noise levels, sources, and/or characteristics associated with unsafe driving behaviors. In some examples, the driver safety score application 132 may transmit the calculated driver safety score, and/or a change in the calculated driver safety score to the onboard computing device 102 for display by the user interface 120. Additionally, in some examples, the driver safety score application 132 may transmit the calculated driver safety score to a third party, such as an insurance company, which may provide discounts for the operator of the vehicle 104 based on his or her driver safety score indicating a high degree of safety, and/or based on an improvement to his or her driver safety score.

Moreover, the computer-readable instructions stored on the memory 128 may include instructions for carrying out any of the steps of the methods 300, 400, and 500 described in greater detail below with respect to FIGS. 3, 4, and 5, respectively. Furthermore, in some examples, steps described above as being performed by the processor 126 of the server 122 may be performed by the processor 114 of the onboard computing device 102, or vice versa.

Figure 2C:
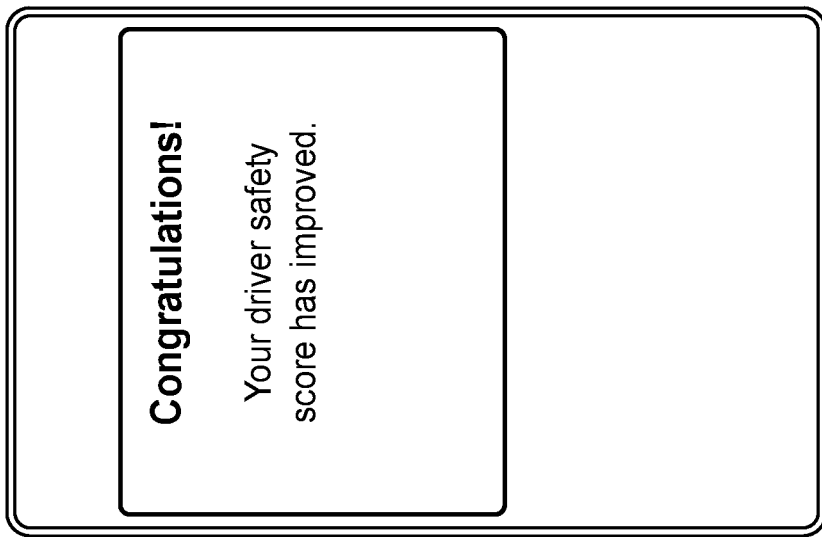
FIG. 2A, FIG. 2B, and FIG. 2C illustrate exemplary user interface displays, in accordance with some embodiments.
Figure 2B:
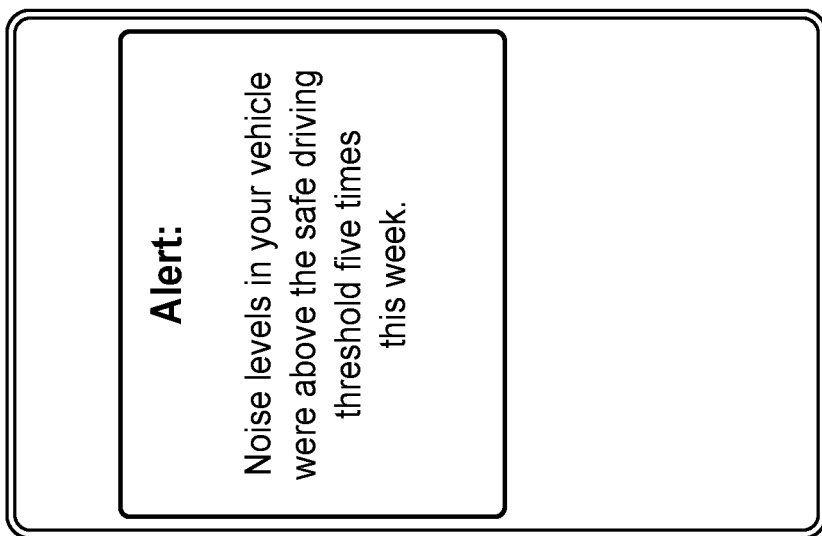
Figure 2A:
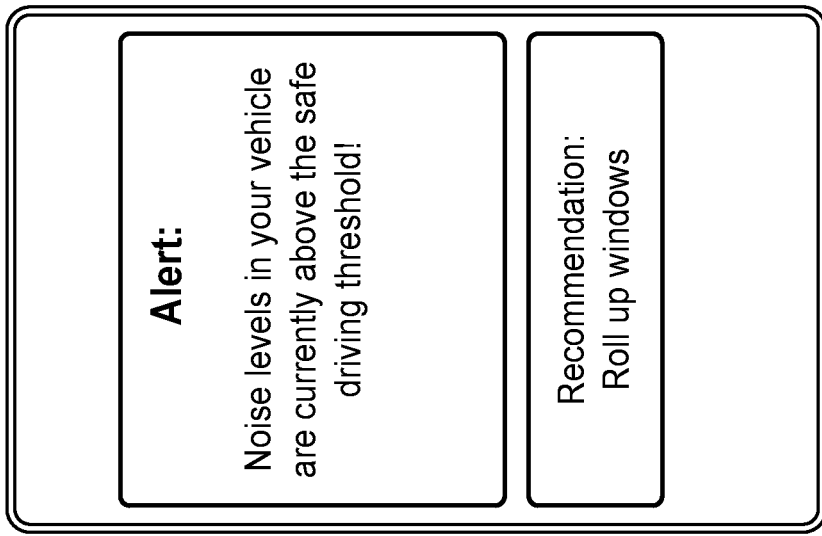

FIGS. 2A, 2B, and 2C illustrate exemplary user interface displays, in accordance with some embodiments. For instance, as shown in FIG. 2A, the user interface of an onboard computing device permanently or temporarily positioned in a vehicle may display an alert related to noises or sounds currently associated with the interior of the vehicle. For instance, as shown in FIG. 2A, the alert may indicate that the current noise levels associated with the interior of the vehicle are currently above a threshold noise level. Additionally or alternatively, in some examples, the alert may indicate that current sounds associated with the interior of the vehicle likely originate from sources associated with unsafe driving behaviors, and/or that current sounds associated with the interior of the vehicle have characteristics associated with unsafe driving behaviors. Additionally, in some examples, as shown in FIG. 2A, the alert may include a recommendation for mitigating the distracting effects of noises or sounds associated with the interior of the vehicle (e.g., rolling up windows, turning down music volume, etc.).

In some examples, as shown in FIG. 2B, a user interface of an onboard computing device permanently or temporarily positioned in a vehicle may display an alert related to noises or sounds associated with the interior of the vehicle over an interval of time (e.g., over an hour, over a day, over a week, etc.) at the end of the interval of time. For example, as shown in FIG. 2B, the user interface display may display an alert indicating that noise levels associated with the interior of the vehicle were above a threshold noise level five times over the course of a week. Additionally or alternatively, the alert may indicate a number of times or a duration of instances in which sounds associated with the interior of the vehicle likely originated from sources associated with unsafe driving behaviors, and/or had other characteristics associated with unsafe driving behaviors, over the interval of time.

In some examples, as shown in FIG. 2C, a user interface of an onboard computing device permanently or temporarily positioned in a vehicle may display an indication of a driver safety score associated with the user (e.g., the driver and/or operator of the vehicle), and/or an indication of a change in the driver safety score associated with the driver (e.g., an improvement or a decline in the driver's driver safety score).

Figure 3:
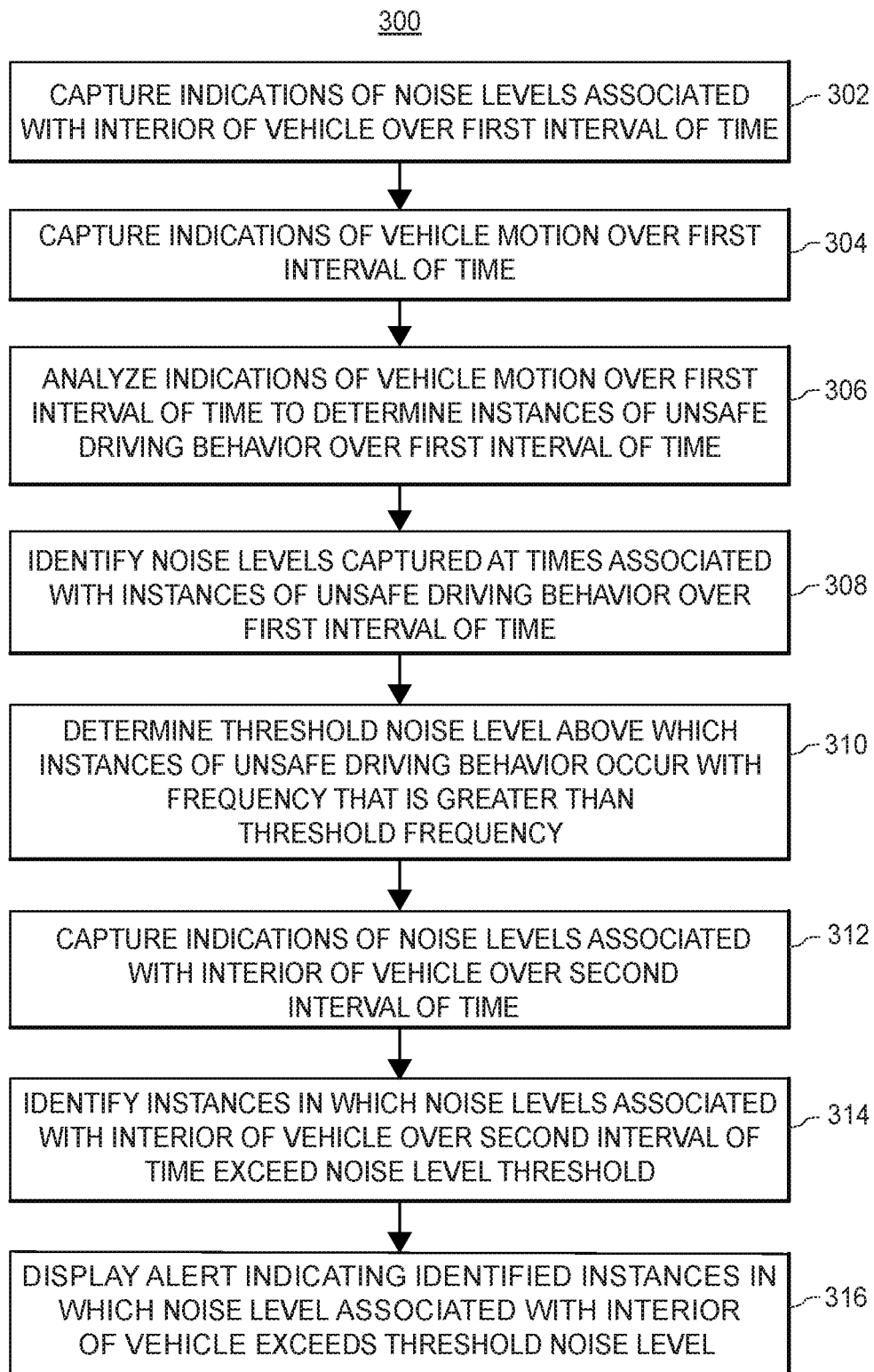
FIG. 3 illustrates a flow diagram of an exemplary method for assessing driver safety based on noise levels associated with the interior of a vehicle, in accordance with some embodiments.

Referring now to FIG. 3, a flow diagram of an exemplary method 300 for assessing driver safety based on noise levels associated with the interior of a vehicle, in accordance with some embodiments. One or more steps of the method 300 may be implemented as a set of instructions stored on a computer-readable memory and executable on one or more processors.

The method 300 may begin when indications of noise levels associated with an interior of a vehicle are captured (block 302) over a first interval of time, e.g., by one or more microphones associated with a vehicle (such as onboard microphones or other noise sensors built into or otherwise positioned within the vehicle, and/or microphones or other noise sensors of an onboard computing device temporarily or permanently positioned within the vehicle). For instance, the indications of the noise levels may be measured in decibels, and each noise level (or each change in noise level) may be associated with a time over the first interval of time (e.g., time stamped).

Indications of vehicle motion may be captured (block 304) over the first interval of time, e.g., by one or more motion sensors associated with the vehicle, such as accelerometers, gyroscopes, etc. For instance, the motion sensors may be onboard motion sensors built into or otherwise positioned within the vehicle, and/or motion sensors of an onboard computing device temporarily or permanently positioned within the vehicle. Each indication of vehicle motion (or each change in vehicle motion) may be associated with a time over the first interval of time (e.g., time stamped).

The indications of the vehicle motion over the first interval of time may be analyzed (block 306) to determine one or more instances of unsafe driving behavior over the first interval of time. For instance, the indications of vehicle motion over the first interval of time may be analyzed to determine indications of vehicle motion typically associated with speeding (e.g., measured velocity above a certain threshold value, measured acceleration above a certain threshold value), hard braking (e.g., measured deceleration above a certain threshold value), sharp cornering (e.g., measured angular velocity or angular acceleration above a certain threshold value), or other unsafe driving maneuvers. Furthermore, the indications vehicle motion over the first interval of time may be analyzed to determine times (including, e.g., frequencies and durations), associated with each indication of unsafe driving behavior over the first interval of time.

Noise levels at times associated with the one or more instances of unsafe driving behavior over the first interval of time may be identified (block 308). For instance, times associated with each noise level over the first interval of time may be correlated and/or compared to times associated with each indication of unsafe driving behavior over the first interval of time to determine which noise levels are associated with unsafe driving behaviors (and/or which noise levels are associated with particular types of unsafe driving behaviors).

A threshold noise level above which instances of unsafe driving behavior occur with a number or a frequency that is greater than a threshold number or frequency may be determined (block 310) based on the noise levels at the times associated with the one or more instances of unsafe driving behavior. For instance, if the threshold number of unsafe driving behavior instances over an interval of time is three, but four instances of unsafe driving behavior occur when the noise levels measured inside the interior of the vehicle are above 70 decibels, then 70 decibels may be selected as the threshold noise level. Similarly, if the threshold frequency of unsafe driving behavior instances is one instance per hour, but two instances occur per hour when the noise levels measured inside the interior of the vehicle are above 60 decibels, then 60 decibels may be selected as the threshold noise level.

Indications of noise levels associated with the interior of the vehicle may be captured (block 312) over a second interval of time (subsequent to the first interval of time), e.g., by one or more microphones associated with the vehicle (such as onboard microphones or other noise sensors built into or otherwise positioned within the vehicle, and/or microphones or other noise sensors of an onboard computing device temporarily or permanently positioned within the vehicle). For instance, the indications of the noise levels may be measured in decibels, and each noise level (or each change in noise level) may be associated with a time over the second interval of time (e.g., time stamped), e.g., as discussed with respect to block 302.

At least one instance in which the noise level associated with the interior of the vehicle exceeds the threshold noise level may be identified (block 314). Identifying the at least one instance may include identifying a duration of the at least one instance, or a frequency of instances. For example, the at least one instance (or frequency or duration of the at least one instance) may be associated with a time over the second interval of time (e.g., at 2:00 PM, the noise level was above 60 decibels; from 3:00 PM to 3:30 PM, the noise level was above 60 decibels; the noise level was above 60 decibels five times in the interval from 2:00 PM to 5:00 PM, etc.).

An alert indicating the identified at least one instance in which the noise level associated with the interior of the vehicle exceeds the threshold noise level may be displayed (block 316), e.g., by a user interface of an onboard computing device or of other computing device associated with the driver or operator of the vehicle. In some examples, the alert may be displayed substantially simultaneously and/or immediately after the instance in which the noise level associated with the interior of the vehicle exceeds the threshold noise level is identified. For instance, the alert may include a recommendation for the operator to turn music levels down inside the vehicle, roll up windows, or take other mitigating steps with respect to a current noise level. In some examples, the alert may be displayed after the instance(s) in which the noise level associated with the interior of the vehicle exceeds the threshold noise level (e.g., at the end of the second interval of time, when the vehicle is stopped, etc.). For instance, the alert may notify the operator of the instances (e.g., including frequency and/or duration) in which the noise level was above the threshold noise level (e.g., including times and/or durations of each instance).

In some examples, the method 300 may include calculating a driver safety score for the driver or operator of the vehicle. The driver safety score (or an indication of a change in the driver safety score) may displayed along with or separately from the alert discussed with respect to block 316, e.g., via a user interface of an onboard computing device of the vehicle or other computing device associated with the driver or operator of the vehicle. The driver safety score may be calculated based on, e.g., the number or frequency of instances in which the noise level in the interior of the vehicle exceeds the threshold noise level over the second interval of time (e.g., two instances over a one-hour interval of time, ten instances over a one-day interval of time, etc.), the duration of each instance in which the noise level in the interior of the vehicle exceeds the threshold noise level over the second interval of time (e.g., instances having an average duration of 15 minutes, one instance having a duration of one hour, etc.), and/or the extent to which the noise level associated with the interior of the vehicle is exceeded during each instance in which the noise level in the interior of the vehicle exceeds the threshold noise level over the second interval of time (e.g., the noise level is on average exceeded by 10 decibels during each instance, the noise level was exceeded by 30 decibels in a particular instance, etc.). For instance, a greater number or frequency of instances, a longer duration of instances, and/or a greater extent to which the noise level is exceeded in each instance are each generally correlated with less safe driving, so the driver safety score calculated for the driver or operator of the vehicle may be decreased when there are a greater number or frequency of instances, a longer duration of instances, and/or a greater extent to which the noise level is exceeded during each instance.

In some examples, the calculated driver safety score may be transmitted to a third party, such as an insurance company. In some examples, based on the calculated driver safety score, the insurance company may provide a discounted price for insurance for the driver or operator of the vehicle. For instance, an alert may be generated indicating an updated discounted price for insurance based on the driver safety score calculated over the second interval of time, e.g., alongside or separate from the generated alert and/or the generated indication of the driver safety score.

Figure 4:
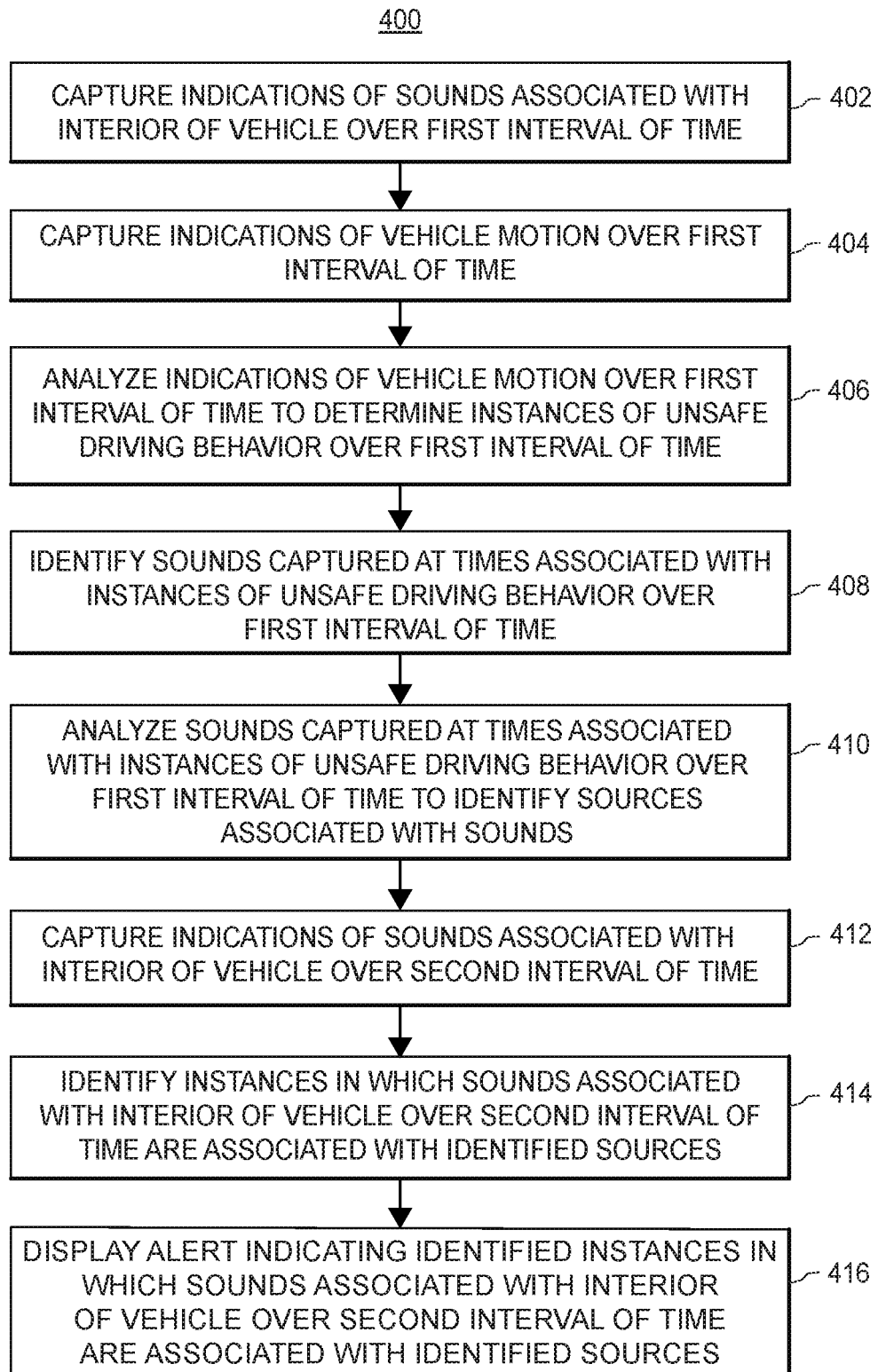
FIG. 4 illustrates a flow diagram of an exemplary method for assessing driver safety based on sources of sounds associated with the interior of a vehicle, in accordance with some embodiments.

Referring now to FIG. 4, a flow diagram of an exemplary method 400 for assessing driver safety based on sources of sounds associated with the interior of a vehicle, in accordance with some embodiments. One or more steps of the method 400 may be implemented as a set of instructions stored on a computer-readable memory and executable on one or more processors.

The method 400 may begin when indications of sounds associated with an interior of a vehicle are captured (block 402) over a first interval of time, e.g., by one or more microphones associated with a vehicle (such as onboard microphones or other noise sensors built into or otherwise positioned within the vehicle, and/or microphones or other noise sensors of an onboard computing device temporarily or permanently positioned within the vehicle). For instance, the microphones or other noise sensors may record interior vehicle audio, and the recording may include timestamps so that sounds occurring at specific times over the first interval of time may be identified.

Indications of vehicle motion may be captured (block 404) over the first interval of time, e.g., by one or more motion sensors associated with the vehicle, such as accelerometers, gyroscopes, etc. For instance, the motion sensors may be onboard motion sensors built into or otherwise positioned within the vehicle, and/or motion sensors of an onboard computing device temporarily or permanently positioned within the vehicle. Each indication of vehicle motion (or each change in vehicle motion) may be associated with a time over the first interval of time (e.g., time stamped).

The indications of the vehicle motion over the first interval of time may be analyzed (block 406) to determine one or more instances of unsafe driving behavior over the first interval of time. For instance, the indications of vehicle motion over the first interval of time may be analyzed to determine indications of vehicle motion typically associated with speeding (e.g., measured velocity above a certain threshold value, measured acceleration above a certain threshold value), hard braking (e.g., measured deceleration above a certain threshold value), sharp cornering (e.g., measured angular velocity or angular acceleration above a certain threshold value), or other unsafe driving maneuvers. Furthermore, the indications vehicle motion over the first interval of time may be analyzed to determine times (including, e.g., frequencies and durations), associated with each indication of unsafe driving behavior over the first interval of time.

Sounds associated with the interior of the vehicle at times associated with the one or more instances of unsafe driving behavior over the first interval of time may be identified (block 408). For instance, times associated with each indication of unsafe driving behavior over the first interval of time may be correlated and/or compared to sounds at those times in order to determine which sounds are associated with unsafe driving behaviors (and/or which sounds are associated with particular types of unsafe driving behaviors).

The identified sounds associated with the interior of the vehicle at times associated with the one or more instances of unsafe driving behavior over the first interval of time may be analyzed (block 410) to identify sources associated with each of the sounds associated with unsafe driving behavior. For instance, the identified sounds may be compared to examples of known sounds (e.g., audio files) associated with various sources typically encountered in driving scenarios, such as, e.g., construction sounds, sounds associated with various types of music, engine sounds, honking sounds, etc. Based on the comparison, a level of similarity between each identified sound and each example sound may be determined. When the level of similarity between an example sound associated with a particular source and an identified sound is above a threshold level (e.g., above 50% similarity, above 75% similarity, above 90% similarity, etc.), the identified sound may be determined to likely originate from the particular source.

Indications of sounds associated with an interior of a vehicle may be captured (block 412) over a second interval of time (subsequent to the first interval of time), e.g., by one or more microphones associated with a vehicle (such as onboard microphones or other noise sensors built into or otherwise positioned within the vehicle, and/or microphones or other noise sensors of an onboard computing device temporarily or permanently positioned within the vehicle). For instance, the microphones or other noise sensors may record interior vehicle audio, and the recording may include timestamps so that sounds occurring at specific times over the second interval of time may be identified.

At least one instance in which a sound captured over the second interval of time is associated with one of the one or more of the sound sources associated with unsafe driving behavior may be identified (block 414). For instance, as discussed with respect to block 410, the sounds captured over the second interval of time may be compared to example sounds associated with the identified sources associated with unsafe driving behavior to determine whether any of the sounds captured over the second interval of time likely originate from sources associated with unsafe driving behavior. For example, the determination of whether any of the sounds captured over the second interval of time likely originate from sources associated with unsafe driving behavior may be based on whether any of the captured sounds have a level of similarity to the example sounds associated with the identified sources associated with unsafe driving behavior above a certain threshold similarity, e.g., above 50% similarity, above 75% similarity, above 90% similarity, etc.

An alert indicating the identified at least one instance in which the sound captured over the second interval of time is associated with one of the one or more of the sound sources associated with unsafe driving behavior may be displayed (block 416), e.g., by a user interface of an onboard computing device or other computing device associated with the driver or operator of the vehicle. In some examples, the alert may be displayed substantially simultaneously and/or immediately after the instance in which the sound captured over the second interval of time is associated with one of the one or more of the sound sources associated with unsafe driving behavior. For instance, the alert may include a recommendation for the operator to turn music down inside the vehicle, roll up windows, or take other mitigating steps with respect to reducing the impact of certain distracting sounds on the driver or operator. In some examples, the recommendation may be based on the particular sound source that is associated with the unsafe driving behavior. For instance, if the sound source is music, the recommendation may be for the driver or operator to turn down music in the vehicle, if the sound source is honking, the recommendation may be to roll up windows of the vehicle, etc. In some examples, the alert may be displayed after the instance(s) in which the sound captured over the second interval of time is associated with one of the one or more of the sound sources associated with unsafe driving behavior (e.g., at the end of the second interval of time, when the vehicle is stopped, etc.). For instance, the alert may notify the operator of the instances (e.g., including frequency and/or duration) in which the sound captured over the second interval of time included sounds associated with one or more of the sound sources associated with unsafe driving behavior (e.g., including times and/or durations of each instance).

In some examples, the method 400 may include calculating a driver safety score for the driver or operator of the vehicle. The driver safety score (or an indication of a change in the driver safety score) may displayed along with or separately from the alert discussed with respect to block 416, e.g., via a user interface of an onboard computing device of the vehicle or other computing device associated with the driver or operator of the vehicle. The driver safety score may be calculated based on, e.g., the number or frequency of instances in which the sound captured over the second interval of time is associated with one of the one or more of the sound sources associated with unsafe driving behavior (e.g., two instances over a one-hour interval of time, ten instances over a one-day interval of time, etc.) and/or the duration of each instance in which the sound captured over the second interval of time is associated with one of the one or more of the sound sources associated with unsafe driving behavior (e.g., instances having an average duration of 15 minutes, one instance having a duration of one hour, etc.). For instance, a greater number or frequency of instances and/or a longer duration of instances are each generally correlated with less safe driving, so the driver safety score calculated for the driver or operator of the vehicle may be decreased when there are a greater number or frequency of instances and/or a longer duration of instances.

In some examples, the calculated driver safety score may be transmitted to a third party, such as an insurance company. In some examples, based on the calculated driver safety score, the insurance company may provide a discounted price for insurance for the driver or operator of the vehicle. For instance, an alert may be generated indicating an updated discounted price for insurance based on the driver safety score calculated over the second interval of time, e.g., alongside or separate from the generated alert and/or the generated indication of the driver safety score.

Figure 5:
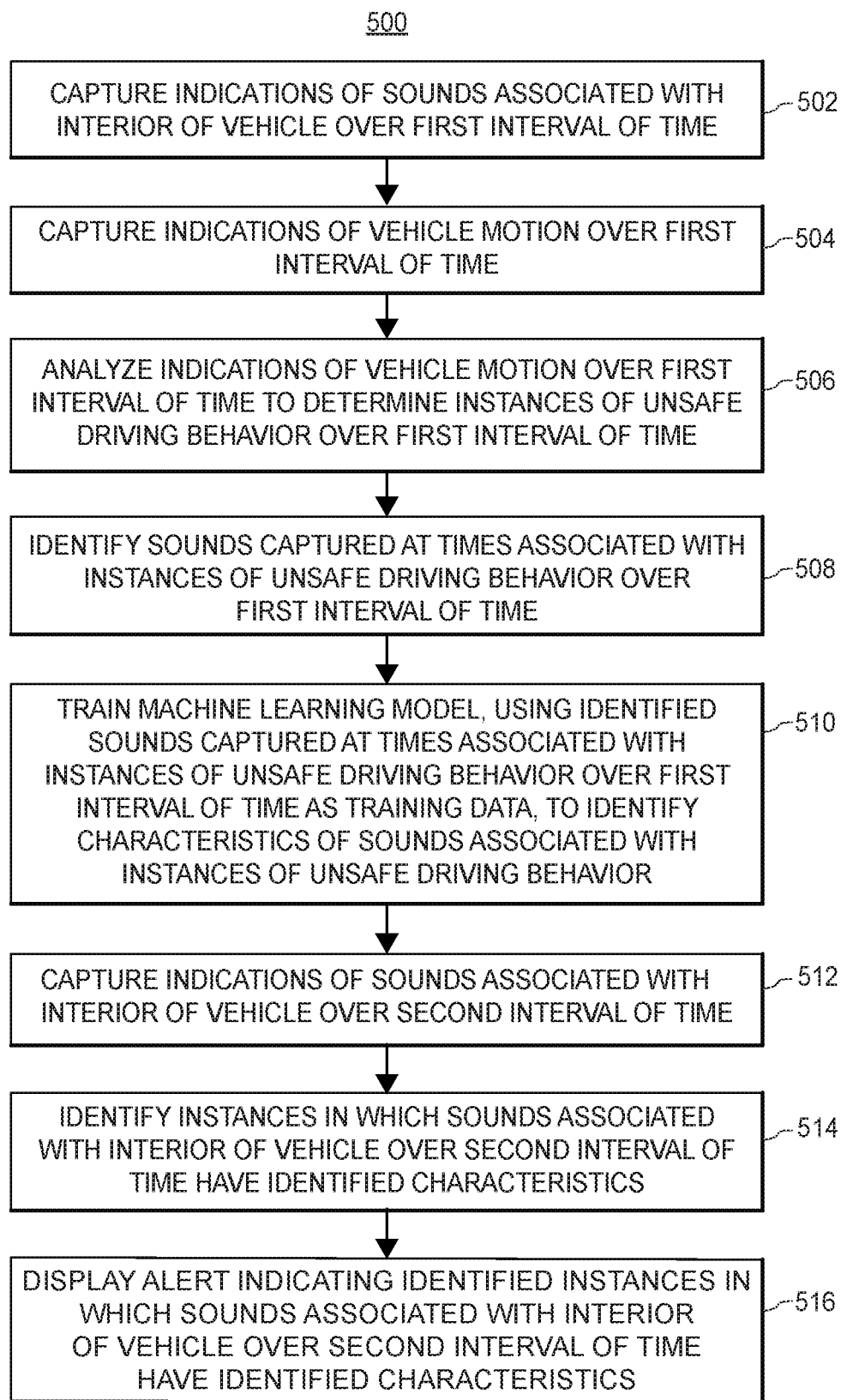
FIG. 5 illustrates a flow diagram of an exemplary method for assessing driver safety based on characteristics of sounds associated with the interior of a vehicle, in accordance with some embodiments.

Referring now to FIG. 5, a flow diagram of an exemplary method 500 for assessing driver safety based on characteristics of sounds associated with the interior of a vehicle, in accordance with some embodiments. One or more steps of the method 500 may be implemented as a set of instructions stored on a computer-readable memory and executable on one or more processors.

The method 500 may begin when indications of sounds associated with an interior of a vehicle are captured (block 502) over a first interval of time, e.g., by one or more microphones associated with the vehicle (such as onboard microphones or other noise sensors built into or otherwise positioned within the vehicle, and/or microphones or other noise sensors of an onboard computing device temporarily or permanently positioned within the vehicle). For instance, the microphones or other noise sensors may record interior vehicle audio, and the recording may include timestamps so that sounds occurring at specific times over the first interval of time may be identified.

Indications of vehicle motion may be captured (block 504) over the first interval of time, e.g., by one or more motion sensors associated with the vehicle, such as accelerometers, gyroscopes, etc. For instance, the motion sensors may be onboard motion sensors built into or otherwise positioned within the vehicle, and/or motion sensors of an onboard computing device temporarily or permanently positioned within the vehicle. Each indication of vehicle motion (or each change in vehicle motion) may be associated with a time over the first interval of time (e.g., time stamped).

The indications of the vehicle motion over the first interval of time may be analyzed (block 506) to determine one or more instances of unsafe driving behavior over the first interval of time. For instance, the indications of vehicle motion over the first interval of time may be analyzed to determine indications of vehicle motion typically associated with speeding (e.g., measured velocity above a certain threshold value, measured acceleration above a certain threshold value), hard braking (e.g., measured deceleration above a certain threshold value), sharp cornering (e.g., measured angular velocity or angular acceleration above a certain threshold value), or other unsafe driving maneuvers. Furthermore, the indications vehicle motion over the first interval of time may be analyzed to determine times (including, e.g., frequencies and durations), associated with each indication of unsafe driving behavior over the first interval of time.

Sounds associated with the interior of the vehicle at times associated with the one or more instances of unsafe driving behavior over the first interval of time may be identified (block 508). For instance, times associated with each indication of unsafe driving behavior over the first interval of time may be correlated and/or compared to sounds at those times in order to determine which sounds are associated with unsafe driving behaviors (and/or which sounds are associated with particular types of unsafe driving behaviors).

A machine learning model may be trained (block 510), using the identified sounds associated with the interior of the vehicle at times associated with the one or more instances of unsafe driving behavior over the first interval of time as training data, to identify characteristics of sounds associated with instances of unsafe driving behavior. For instance, the machine learning model may be trained to learn common characteristics of sounds that are associated with instances of unsafe driving behavior for a particular driver, which may include noise levels associated with the sounds, pitches associated with the sounds, tones associated with the sounds, timbres associated with the sounds, repetition associated with the sounds, some combination of these, and/or any other suitable characteristics of sounds.

Indications of sounds associated with an interior of a vehicle may be captured (block 512) over a second interval of time, e.g., by one or more microphones associated with the vehicle (such as onboard microphones or other noise sensors built into or otherwise positioned within the vehicle, and/or microphones or other noise sensors of an onboard computing device temporarily or permanently positioned within the vehicle). For instance, the microphones or other noise sensors may record interior vehicle audio, and the recording may include timestamps so that sounds occurring at specific times over the second interval of time may be identified.

The sounds occurring over the second interval of time may be analyzed to identify (block 514) at least one instance in which a sound captured over the second interval of time has one of the characteristics associated with unsafe driving behavior. In particular, the trained machine learning model may be applied to the sounds captured over the second interval of time to identify sounds having characteristics associated with unsafe driving behavior. In some instances, the sounds may be analyzed to identify instances in which the sound captured over the second interval of time has multiple of the characteristics associated with unsafe driving behavior.

An alert indicating the identified at least one instance in which the sound captured over the second interval of time has one of the characteristics associated with unsafe driving behavior may be displayed (block 516), e.g., by a user interface of an onboard computing device or other computing device associated with the driver or operator of the vehicle. In some examples, the alert may be displayed substantially simultaneously and/or immediately after the instance in which the sound captured over the second interval of time is associated with one of the one or more of the characteristics associated with unsafe driving behavior. In some examples, the alert may be displayed after the instance(s) in which the sound captured over the second interval of time is associated with one of the one or more of the sound sources associated with unsafe driving behavior (e.g., at the end of the second interval of time, when the vehicle is stopped, etc.). For instance, the alert may notify the operator of the instances (e.g., including frequency and/or duration) in which the sound captured over the second interval of time included sounds associated with one or more of the sound characteristics associated with unsafe driving behavior (e.g., including times and/or durations of each instance).

In some examples, the method 500 may include calculating a driver safety score for the driver or operator of the vehicle. The driver safety score (or an indication of a change in the driver safety score) may displayed along with or separately from the alert discussed with respect to block 416, e.g., via a user interface of an onboard computing device of the vehicle or other computing device associated with the driver or operator of the vehicle. The driver safety score may be calculated based on, e.g., the number or frequency of instances in which the sound captured over the second interval of time has one of the characteristics associated with unsafe driving behavior (e.g., two instances over a one-hour interval of time, ten instances over a one-day interval of time, etc.) and/or the duration of each instance in which the sound captured over the second interval of time has one of the characteristics associated with unsafe driving behavior (e.g., instances having an average duration of 15 minutes, one instance having a duration of one hour, etc.). For instance, a greater number or frequency of instances and/or a longer duration of instances are each generally correlated with less safe driving, so the driver safety score calculated for the driver or operator of the vehicle may be decreased when there are a greater number or frequency of instances and/or a longer duration of instances.

In some examples, the calculated driver safety score may be transmitted to a third party, such as an insurance company. In some examples, based on the calculated driver safety score, the insurance company may provide a discounted price for insurance for the driver or operator of the vehicle. For instance, an alert may be generated indicating an updated discounted price for insurance based on the driver safety score calculated over the second interval of time, e.g., alongside or separate from the generated alert and/or the generated indication of the driver safety score.

Moreover, in some examples, the method 300 may include steps from the method 400 and/or the method 500, the method 400 may include steps from the method 300 and/or the method 500, and/or the method 500 may include steps from the method 300 and/or the method 400. For example, the alert may be generated based on a combination of instances in which the threshold noise level is exceeded, instances in which sounds are determined to originate from sources associated with unsafe driving, and/or instances in which sounds are determined to include characteristics associated with unsafe driving. Similarly, as another example, the driver safety score may be calculated based on a combination of instances in which the threshold noise level is exceeded, instances in which sounds are determined to originate from sources associated with unsafe driving, and/or instances in which sounds are determined to include characteristics associated with unsafe driving.

With the foregoing, an insurance customer may opt-in to a rewards, insurance discount, or other type of program. After the insurance customer provides their affirmative consent, an insurance provider remote server may collect data from the customer's mobile device or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of assessing driver safety based on noise levels or sounds associated with an interior of a vehicle, comprising:
    capturing, by one or more microphones associated with the vehicle, one or more first indications of first noise levels associated with the interior of the vehicle over a first interval of time;
    capturing, by one or more motion sensors associated with the vehicle, indications of vehicle motion over the first interval of time;
    analyzing, by a processor, the indications of the vehicle motion over the first interval of time to determine one or more instances of unsafe driving behavior over the first interval of time;
    identifying, by the processor, one or more first noise levels at times associated with the one or more instances of unsafe driving behavior over the first interval of time;
    determining, by the processor, based on the identified one or more first noise levels at the one or more times associated with the one or more instances of unsafe driving behavior, a threshold noise level above which instances of unsafe driving behavior occur with a frequency that is greater than a threshold frequency;
    capturing, by the one or more microphones associated with the vehicle, one or more second indications of second noise levels associated with the interior of the vehicle over a second interval of time;
    identifying, by the processor, based on the one or more second indications of the second noise levels associated with the interior of the vehicle over the second interval of time, at least one second noise level of the second noise levels in which the at least noise level associated with the interior of the vehicle exceeds the threshold noise level; and
    displaying, by a user interface, an alert indicating the identified at least one second noise level in which the at least one second noise level associated with the interior of the vehicle exceeds the threshold noise level.

2. The computer-implemented method of claim 1, wherein the displaying an alert indicating the identified at least one second noise level in which the at least one second noise level associated with the interior of the vehicle exceeded the threshold noise level includes displaying the alert substantially simultaneously with the identification of the at least one second noise level in which the at least one second noise level associated with the interior of the vehicle exceeds the threshold noise level.

3. The computer-implemented method of claim 1, wherein the displaying an alert indicating the at least one second noise level in which the at least one second noise level associated with the interior of the vehicle exceeded the threshold noise level includes displaying the alert at a time subsequent to the second interval of time.

4. The computer-implemented method of claim 1, further comprising:
    calculating, based on one or more of (i) a number of instances in which a second noise level of the second noise levels associated with the interior of the vehicle exceeds the threshold noise level over the second interval of time; (ii) a duration of each instance in which the second noise level associated with the interior of the vehicle exceeds the threshold noise level over the second interval of time; and (iii) an extent to which the second noise level associated with the interior of the vehicle is exceeded during each instance in which the noise level associated with the interior of the vehicle exceeds the threshold noise level over the second interval of time, a driver safety score for a driver of the vehicle; and
    wherein displaying, by a user interface, the alert indicating the identified at least one second noise level in which the at least one second noise level associated with the interior of the vehicle exceeded the threshold noise level, includes presenting the calculated driver safety score by the user.

5. The computer-implemented method of claim 1, further comprising:
    capturing, by one or more microphones associated with the vehicle, indications of sounds associated with the interior of the vehicle over the first interval of time;
    identifying, by the processor, the sounds captured at times associated with the one or more instances of unsafe driving behavior over the first interval of time;
    analyzing, by the processor, the sounds captured by the one or more microphones at times associated with the one or more instances of unsafe driving behavior over the first interval of time to identify one or more sources associated with sounds captured at times associated with the one or more instances of unsafe driving behavior;

capturing, by the one or more microphones associated with the vehicle, indications of sounds associated with the interior of the vehicle over the second interval of time;

identifying, by the processor, based on the indications of sounds associated with the interior of the vehicle over the second interval of time, at least one instance in which a sound captured over the second interval of time is associated with one of the one or more identified sources; and displaying, by the user interface, an alert indicating the identified at least one instance in which the sound captured over the second interval of time is associated with one of the one or more identified sources.

6. The computer-implemented method of claim 1, further comprising:

capturing, by one or more microphones associated with the vehicle, indications of sounds associated with the interior of the vehicle over the first interval of time;

identifying, by the processor, the sounds captured at times associated with the one or more instances of unsafe driving behavior over the first interval of time;

training, by the processor, a machine learning model, using the sounds captured at times associated with the one or more instances of unsafe driving behavior over the first interval of time as training data, to identify characteristics of sounds associated with instances of unsafe driving behavior;

capturing, by the one or more microphones associated with the vehicle, indications of sounds associated with the interior of the vehicle over the second interval of time;

applying, by the processor, the trained machine learning model to the sounds associated with the interior of the vehicle over the second interval of time to identify at least one instance in which a sound associated with the interior of the vehicle over the second interval of time has one of the identified characteristics;

displaying, by the user interface, an alert indicating the identified at least one instance in which the sound associated with the interior of the vehicle over the second interval of time has one of the identified characteristics.

7. The computer-implemented method of claim 6, further comprising:

calculating, based on one or more of (i) a number of instances in which sound associated with the interior of the vehicle over the second interval of time has one of the identified characteristics; and (ii) the duration of instances in which sound associated with the interior of the vehicle over the second interval of time has one of the identified characteristics, a driver safety score for a driver of the vehicle; and wherein the displaying, by the user interface, an alert indicating the identified at least one instance in which the noise level associated with the interior of the vehicle exceeded the threshold noise level includes displaying the calculated driver safety score by the user.

8. A computer system for assessing driver safety based on noise levels or sounds associated with an interior of a vehicle, comprising:

one or more microphones associated with the vehicle, the one or more microphones configured to capture indications of sounds associated with the interior of the vehicle over a first interval of time and indications of sounds associated with the interior of the vehicle over a second interval of time;

one or more motion sensors associated with the vehicle, the one or more motion sensors configured to capture indications of vehicle motion over the first interval of time and indications of vehicle motion over the second interval of time;

a user interface;

one or more processors; and a non-transitory program memory configured to interface with the one or more microphones associated with the vehicle, the one or more motion sensors associated with the vehicle, the user interface, and the one or more processors, and storing executable instructions that, when executed by the one or more processors, cause the computer system to:

analyze the indications of the vehicle movements over the first interval of time to determine one or more instances of unsafe driving behavior over the first interval of time;

identify sounds captured at times associated with the one or more instances of unsafe driving behavior over the first interval of time;

analyze the sounds captured at times associated with the one or more instances of unsafe driving behavior over the first interval of time to identify one or more sources associated with the sounds captured at times associated with the one or more instances of unsafe driving behavior;

identify, by the processor, based on the indications of the sounds associated with the interior of the vehicle over the second interval of time, at least one instance in which a sound captured over the second interval of time is associated with one of the one or more identified sources; and display, via the user interface, an alert indicating the identified at least one instance in which a sound captured over the second interval of time is associated with one of the one or more identified sources.

9. The computer system of claim 8, wherein to display an alert indicating the identified at least one instance in which a sound captured over the second interval of time is associated with one of the one or more identified sources includes to display the alert substantially simultaneously with the identification of the at least one instance in which a sound captured over the second interval of time is associated with one of the one or more identified sources.

10. The computer system of claim 8, wherein to display an alert indicating the identified at least one instance in which a sound captured over the second interval of time is associated with one of the one or more identified sources includes to display the alert at a time subsequent to the second interval of time.

11. The computer system of claim 8, wherein the executable instructions, when executed by the one or more processors, further cause the computer system to:

calculate, based on one or more of (i) a number of instances in which sound associated with the interior of the vehicle over the second interval of time is associated with one of the one or more identified sources; and (ii) the duration of instances in which sound associated with the interior of the vehicle over the second interval of time is associated with one of the one or more identified sources, a driver safety score for a driver of the vehicle; and wherein to display an alert indicating the identified at least one instance in which a sound captured over the second interval of time is associated with one of the one or more identified sources includes to display the calculated driver safety score by the user.

12. The computer system of claim 8, wherein the executable instructions, when executed by the one or more processors, further cause the computer system to:
train a machine learning model, using the sounds captured at times associated with the one or more instances of unsafe driving behavior over the first interval of time as training data, to identify characteristics of sounds associated with instances of unsafe driving behavior;
apply the trained machine learning model to the sounds associated with the interior of the vehicle over the second interval of time to identify at least one instance in which a sound associated with the interior of the vehicle over the second interval of time has one of the identified characteristics; and
display, by the user interface, an alert indicating the identified at least one instance in which a sound associated with the interior of the vehicle over the second interval of time has one of the identified characteristics.

13. The computer system of claim 12, wherein the executable instructions, when executed by the one or more processors, further cause the computer system to:
calculate, based on one or more of (i) a number of instances in which sound associated with the interior of the vehicle over the second interval of time has one of the identified characteristics; and (ii) the duration of instances in which sound associated with the interior of the vehicle over the second interval of time has one of the identified characteristics; a driver safety score for a driver of the vehicle; and
wherein to display an alert indicating the identified at least one instance in which a sound associated with the interior of the vehicle over the second interval of time has one of the identified characteristics includes to display the calculated driver safety score by the user.

14. The computer system of claim 8, wherein the one or more microphones associated with the vehicle are further configured to capture indications of noise levels associated with the interior of the vehicle over the first interval of time and indications of noise levels associated with the interior of the vehicle over the second interval of time; and wherein the executable instructions, when executed by the one or more processors, further cause the computer system to:
identify the noise levels captured by the one or more microphones at times associated with the one or more instances of unsafe driving behavior over the first interval of time;
determine, based on the noise levels at the times associated with the one or more instances of unsafe driving behavior, a threshold noise level above which instances of unsafe driving behavior occur with a frequency that is greater than a threshold frequency;
identify, by the processor, based on a noise level of the noise levels associated with the interior of the vehicle over the second interval of time, at least one instance in which the noise level exceeds the threshold noise level; and
display, via the user interface, an alert indicating the identified at least one instance in which the noise level exceeds the threshold noise level.

15. A tangible, non-transitory computer-readable medium storing executable instructions for assessing driver safety based on noise levels or sounds associated with an interior of a vehicle that, when executed by at least one processor of a computer system, cause the computer system to:
capture, by one or more microphones associated with a vehicle, indications of sounds associated with the interior of the vehicle over a first interval of time;
capture, by one or more motion sensors associated with the vehicle, indications of vehicle motion over the first interval of time;
analyze the indications of the vehicle movements over the interval of time to determine one or more instances of unsafe driving behavior over the first interval of time;
identify sounds captured at times associated with the one or more instances of unsafe driving behavior over the first interval of time;
train a machine learning model, using the sounds captured at times associated with the one or more instances of unsafe driving behavior over the first interval of time as training data, to identify characteristics of sounds associated with instances of unsafe driving behavior;
capture, by one or more microphones associated with a vehicle, indications of sounds associated with the interior of the vehicle over a second interval of time;
apply the trained machine learning model to the sounds associated with the interior of the vehicle over the second interval of time to identify at least one instance in which a sound associated with the interior of the vehicle over the second interval of time has one of the identified characteristics; and
display, by a user interface, an alert indicating the identified at least one instance in which a sound associated with the interior of the vehicle over the second interval of time has one of the identified characteristics.

16. The tangible, non-transitory computer-readable medium of claim 15, wherein to displaying an alert indicating the identified at least one instance in which a sound associated with the interior of the vehicle over the second interval of time has one of the identified characteristics includes to display the alert substantially simultaneously with the identification of the at least one instance in which a sound associated with the interior of the vehicle over the second interval of time has one of the identified characteristics.

17. The tangible, non-transitory computer-readable medium of claim 15, wherein to display an alert indicating the identified at least one instance in which a sound associated with the interior of the vehicle over the second interval of time has one of the identified characteristics includes to display the alert at a time subsequent to the second interval of time.

18. The tangible, non-transitory computer-readable medium of claim 15, wherein the executable instructions, when executed by at least one processor of the computer system, further cause the computer system to:
calculate, based on one or more of (i) a number of instances in which sound associated with the interior of the vehicle over the second interval of time has one of the identified characteristics; and (ii) the duration of instances in which sound associated with the interior of the vehicle over the second interval of time has one of the identified characteristics; a driver safety score for a driver of the vehicle; and
wherein to display an alert indicating the identified at least one instance in which a sound associated with the interior of the vehicle over the second interval of time has one of the identified characteristics includes to display the calculated driver safety score by the user.

19. The tangible, non-transitory computer-readable medium of claim 15, wherein the executable instructions, when executed by at least one processor of the computer system, further cause the computer system to:

analyze the sounds captured by the one or more microphones at times associated with the one or more instances of unsafe driving behavior over the first interval of time to identify one or more sources associated with sounds captured at times associated with the one or more instances of unsafe driving behavior;

identify based on the indications of sounds associated with the interior of the vehicle over the second interval of time, at least one instance in which a sound captured over the second interval of time is associated with one of the one or more identified sources; and display, via the user interface, an alert indicating the identified at least one instance in which the sound captured over the second interval of time is associated with one of the one or more identified sources.

20. The tangible, non-transitory computer-readable medium of claim 15, wherein the executable instructions, when executed by at least one processor of the computer system, further cause the computer system to:

identify noise levels associated with the sounds captured by the one or more microphones at the times associated with the one or more instances of unsafe driving behavior over the first interval of time;

determine, based on the noise levels at the times associated with the one or more instances of unsafe driving behavior, a threshold noise level above which instances of unsafe driving behavior occur with a frequency that is greater than a threshold frequency;

identify based on a noise level of the noise levels associated with the interior of the vehicle over the second interval of time, at least one instance in which the noise level exceeds the threshold noise level; and display, via the user interface, an alert indicating the identified at least one instance in which the noise level exceeds the threshold noise level.

21. A computer-implemented method of assessing driver safety based on noise levels or sounds associated with an interior of a vehicle, comprising:

receiving one or more first indications of first noise levels collected by one or more microphones associated with the interior of the vehicle over a first interval of time;

receiving one or more second indications of vehicle motion associated with the vehicle and collected by one or more motion sensors over the first interval of time;

analyzing, by a processor, the one or more second indications of the vehicle motion over the first interval of time to determine one or more instances of unsafe driving behavior over the first interval of time;

identifying, by the processor, one or more first noise levels at one or more times corresponding to the one or more instances of unsafe driving behavior over the first interval of time based on the one or more first indications of first noise levels;

determining, by the processor, based on the identified one or more first noise levels at the one or more times corresponding to the one or more instances of unsafe driving behavior, a threshold noise level above which instances of unsafe driving behavior occur with a frequency that is greater than a threshold frequency;

receiving one or more third indications of second noise levels collected by the one or more microphones and associated with the interior of the vehicle over a second interval of time;

identifying, by the processor, based on the one or more second indications of the second noise levels associated with the interior of the vehicle over the second interval of time, at least one second noise level of the second noise levels in which the at least one second noise level associated with the interior of the vehicle exceeds the threshold noise level; and generating, by the processor, an alert indicating the identified at least one second noise level in which the at least one second noise level associated with the interior of the vehicle exceeds the threshold noise level.

* * * * *